United States Patent [19]

Wagnon et al.

[11] 4,110,216

[45] Aug. 29, 1978

[54] APPARATUS FOR COLLECTING DEBRIS FLOATING IN A STREAM

[76] Inventors: Albert Lloyd Wagnon, 2167 Capehart Pl. NE., Atlanta, Ga. 30345; Alexandros James Janoulis, 1957 Kilburn Dr., Atlanta, Ga. 30324

[21] Appl. No.: 679,168

[22] Filed: Apr. 22, 1976

[51] Int. Cl.² .............................................. B01D 33/22
[52] U.S. Cl. ..................................... 210/156; 210/170
[58] Field of Search ................. 61/1 F, 2, 17, 24, 23; 210/153, 154, 155, 156, 158, 160, 242 R, 526, 170

[56] References Cited

U.S. PATENT DOCUMENTS

| 452,702 | 5/1891 | Grabill | 210/155 |
|---|---|---|---|
| 766,850 | 8/1904 | Smith | 210/156 |
| 818,288 | 4/1906 | Race | 210/156 |
| 944,907 | 12/1909 | Powers | 210/156 |
| 1,225,160 | 5/1917 | Nihart | 210/154 |
| 1,493,405 | 5/1924 | Tuckfield | 210/156 |
| 1,530,551 | 3/1925 | Fry | 210/156 |
| 1,709,291 | 4/1929 | Vidler | 210/242 R |
| 1,825,169 | 9/1931 | Wyckoff | 210/154 |
| 1,999,637 | 4/1935 | Pettepher | 210/156 |
| 2,636,296 | 4/1953 | King | 61/24 |
| 2,936,074 | 5/1960 | Torshee | 210/156 |
| 3,477,579 | 11/1969 | Turner | 210/156 |
| 3,643,804 | 2/1972 | Sharpton | 210/526 |
| 3,693,355 | 9/1972 | Duboucher | 61/24 |

FOREIGN PATENT DOCUMENTS

| 667,795 | 10/1929 | France | 210/156 |
|---|---|---|---|
| 2,259,281 | 6/1973 | Fed. Rep. of Germany | 210/242 S |
| 41,877 | 12/1887 | Fed. Rep. of Germany | 210/154 |
| 139,005 | 3/1903 | Fed. Rep. of Germany | 210/156 |
| 33,741 | 8/1911 | Sweden | 210/154 |

*Primary Examiner*—Theodore A. Granger
*Attorney, Agent, or Firm*—Walter M. Rodgers; Walter A. Rodgers

[57] ABSTRACT

Apparatus for collecting debris floating in a stream comprises collector means disposed astride the stream with a first part arranged to engage and intercept floating debris and with another part pivotally mounted downstream and above the surface of the stream, and lift means secured to the collector means adjacent the first part for controlling the elevation of the first part in accordance with variations in the level of the stream.

4 Claims, 5 Drawing Figures

APPARATUS FOR COLLECTING DEBRIS FLOATING IN A STREAM

Often adverse weather conditions cause a greater than normal flow of water to occur in existing storm drainage systems. As the flow of water increases, various types of debris such as logs, brush, trash and the like are swept into the rushing water. The debris may ultimately collect about the entrance to a conduit or other type of water flow restriction. Of course this impedes the flow of water and may cause an undesirable flooding condition.

Known debris collection systems usually embody a screen or other filtering media which are essentially fixed in place. As a result a great deal of debris is collected on the filter media which in time causes a virtual blockage in the flow of water down the stream. In addition it is very difficult to remove collected debris in this type of system especially during increased water flow conditions.

According to this invention, apparatus is provided for collecting debris floating in a stream and the apparatus in one form may comprise collector means disposed astride the stream with a first part arranged to engage and intercept floating debris and with another part pivotally mounted downstream from the first part and above the surface of the stream, and lift means secured to the collector means adjacent the first part for controlling the elevation of the first part in accordance with variations in the level of water in the stream.

For a better understanding of the invention reference may be had to the following detailed description taken in conjunction with the accompanying drawings in which FIG. 1 is a perspective view of apparatus constructed according to this invention;

FIG. 3 is a side view showing the disposition of the apparatus at a normal flow of water including dotted lines showing the disposition of the apparatus during increased flow conditions; and in which

Figure 1:
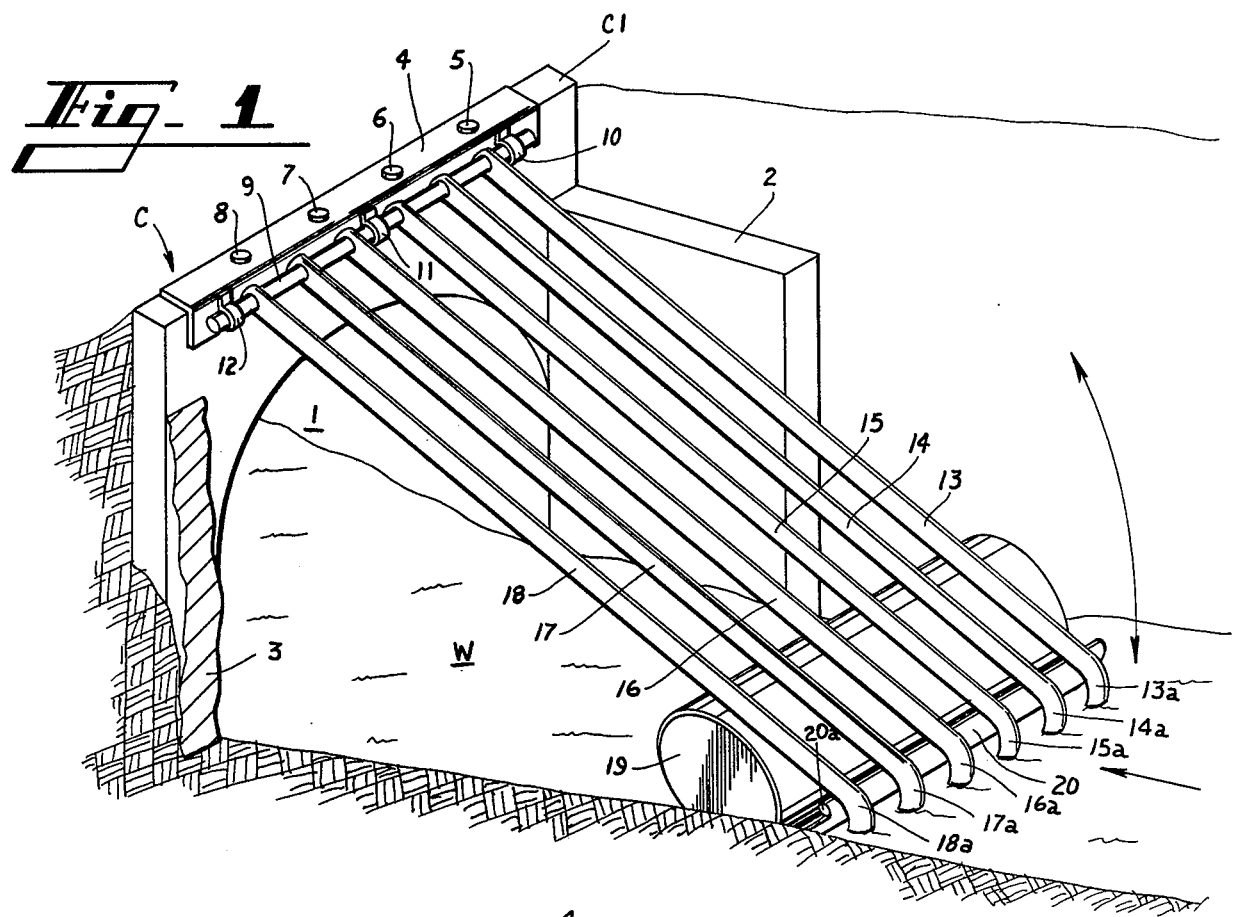
Figure 2:
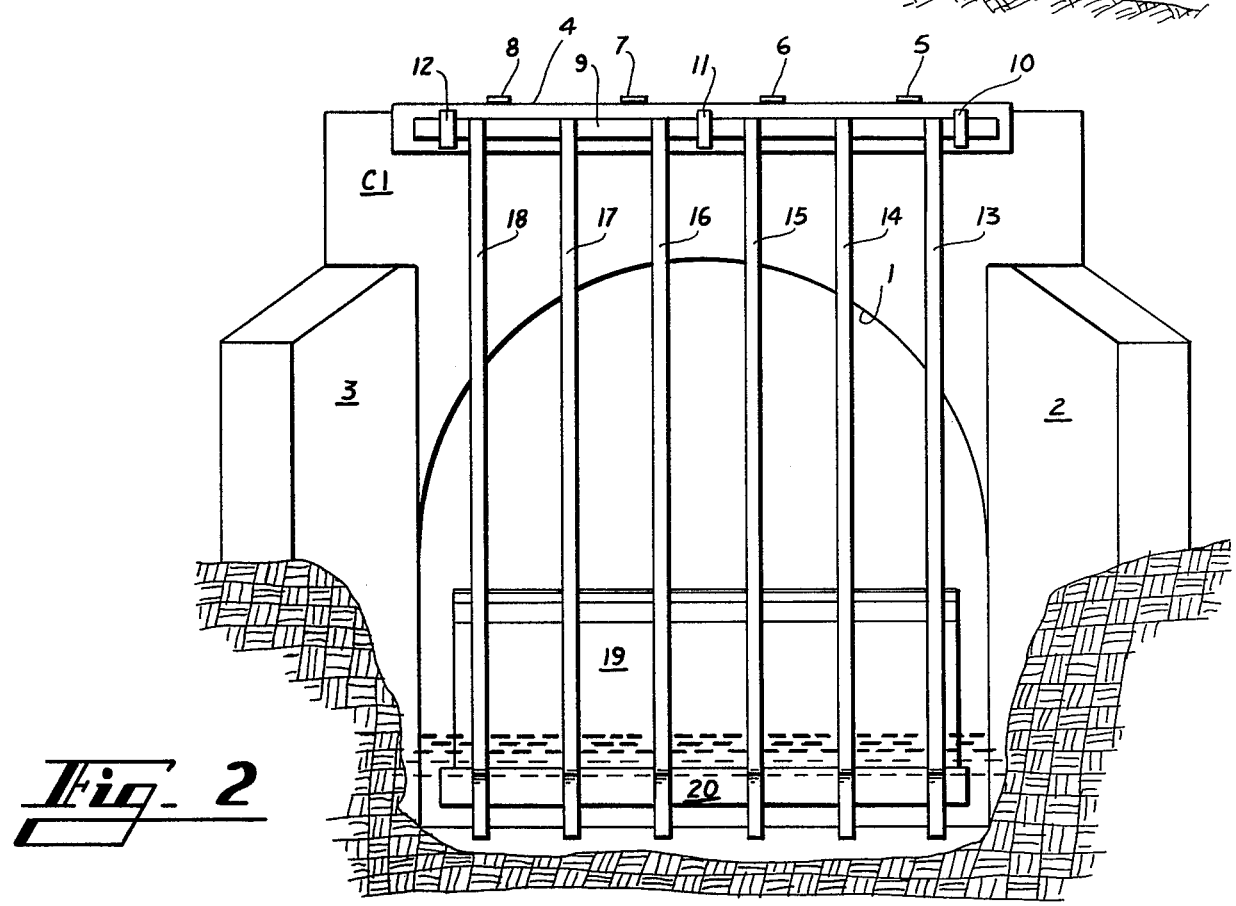
FIG. 2 is a front view of the structure shown in FIG. 1.

In the drawings the letter W depicts a stream which flows through a conduit generally designated by the letter C. Conduit C is provided with a crosshead C1 having an entrance 1. Disposed generally perpendicular to entrance 1 are flow directing guide walls 2 and 3.

For securing the apparatus, constructed according to this invention, to crosshead C1 of conduit C, mounting bracket 4 is provided and is secured to the upper portion of crosshead C1 by means of bolts such as 5, 6, 7 and 8. Rod 9 is rotatably mounted on bracket 4 by means of bracket elements 10, 11 and 12.

For the purpose of collecting debris floating downstream, a plurality of collector bars such as 13, 14, 15, 16, 17 and 18 are provided and are secured to pivotally mounted rod 9. The upstream ends of collector bars 13-18 are arcuate in shape as shown at 13a, 14a, 15a, 16a, 17a, and 18a. Collector bars 13-18 are spaced apart a distance which allows debris of significant size to be intercepted and collected thereon while at the same time allowing seeds and small debris to flow therebetween.

In order to adapt the device for changing stream conditions, collector bars 13-18 are lifted by means of hydrofoil element 20 secured to the collector bars by any suitable means such as by rod 20a disposed adjacent to and on the upstream side of float means in the form of tank 19 which provides buoyancy substantially independent of changing flow conditions.

Figure 3:
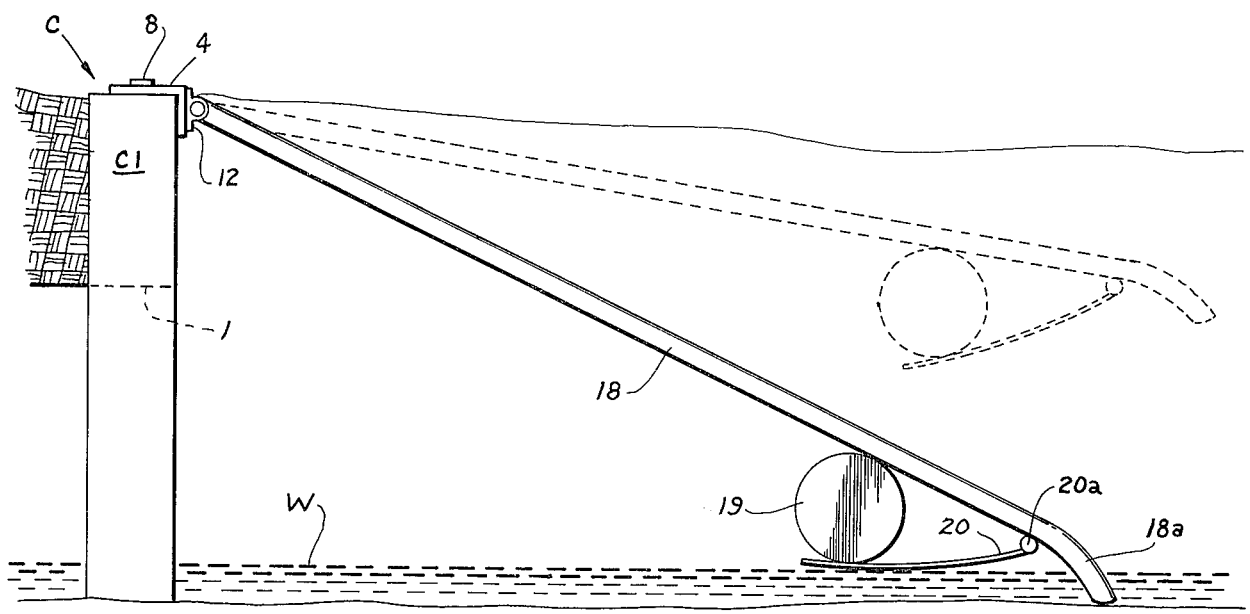

As best shown in FIG. 3, the combined lifting effect of the tank 19 and the action of the flowing water against hydrofoil element 20 causes collector bars 13-18 to rise in a generally vertical direction by an amount which increases as the flow of water increases. Therefore significant floating debris is intercepted by arcuate ends 13a-18a and then collected on collector bars 13-18. Of course the angle of collector bars 13-18 must be sufficient to allow the collected debris to be transported downstream on collector bars 13-18 and not be concentrated at the upstream ends of the bars. As the debris accumulates on collector bars 13-18, it can be easily removed either manually or by machine. Also collector bars 13-18 can be swung counterclockwise as viewed in FIG. 3 through an angle sufficient to allow any debris to slide down and off the collector bars for subsequent removal.

Figure 4:
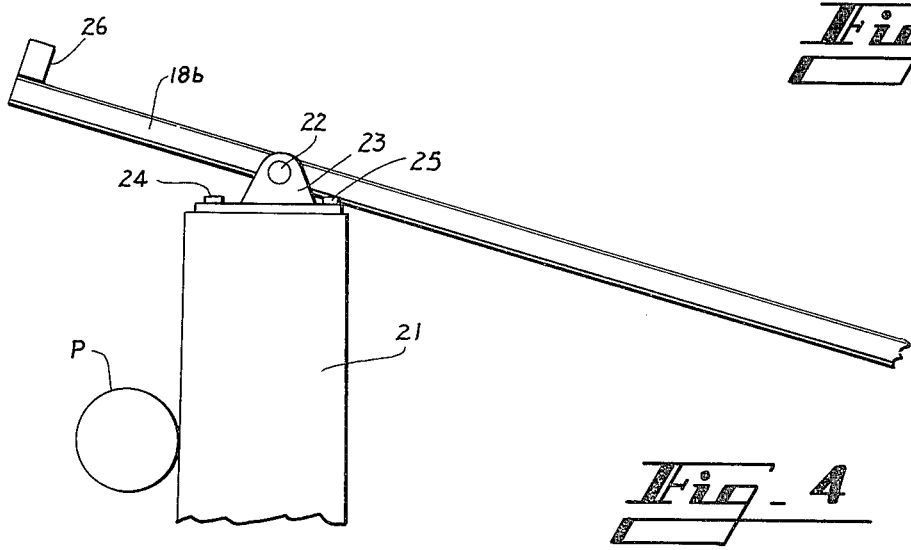
FIGS. 4 and 5 are enlarged side views of a portion of the apparatus showing modifications of the invention.
Figure 5:
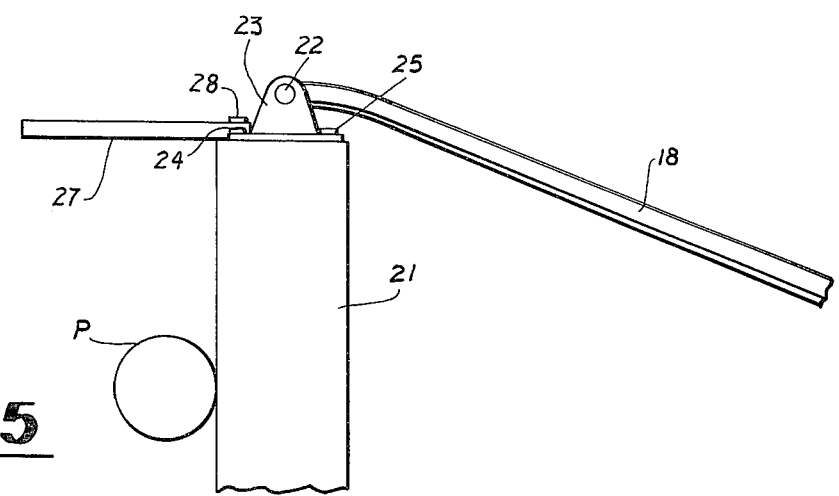

Debris often collides with and may damage submerged objects such as pipe p shown in FIGS. 4 and 5. This invention can be utilized at any point along a stream by placing suitable foundation means, such as a post 21, on each bank of the stream. A rod 22 may be pivotally mounted on each post 21 by brackets 23 which in turn are mounted on posts 21 by means of bolts 24 and 25.

To enchance the lift characteristics of this invention, collector bars 13-18 can be extended downstream as shown at 18b in FIG. 4. Depending on stream conditions, a counterweight 26 of appropriate size may be mounted on the extreme downstream ends of collector bars 13-18 and if desired may be adjustable as by the addition of sand bags or the like or by accumulated.

A further modification of this invention is shown in FIG. 5 and includes a rack 27 fixedly mounted on posts 21 by any suitable means such as by a plurality of bolts 28. Debris may be accumulated on rack 27 by swinging the collector bars counterclockwise or by the force imparted to the debris from the momentum and lifting action of the water. Pipe p is thus fully protected from possible damage due to the impact therewith of heavy logs and the like. Debris may be moved manually from rack 27.

Therefore, by this invention, floating debris is easily and efficiently intercepted and collected from a stream thereby to minimize or eliminate the chance of blockage of a conduit or other water flow restriction and to reduce stream pollution from urban debris. In addition, as the apparatus is forced to pivot in an upward direction, the possibility of flooding is reduced because the majority of water is allowed to flow unimpeded underneath the collector bars.

The embodiments of the invention in which an exclusive property or privilege is claimed are defined as follows:

1. Apparatus for collecting solid debris floating in a stream comprising, in combination, a stream defined by a bottom with banks defining sidewalls for the bottom, collector means consisting of elongate bars horizontally spaced apart in the direction of the width of the stream and arranged vertically above the bottom thereof, an elongate member horizontally arranged above the bottom of the stream with its axis extending across the width thereof defined by the spaced apart sidewalls of the stream, support means for each end of said member located on each sidewall of the stream, first upper ends of the elongate bars defining the collector means pivotally connected to said horizontal member for pivotal movement around the longitudinal axis of said member, second lower ends of the elongate bars connected by float means with a planar surface extending in the direction of the width of the collector surface, said direction being at right angles to the longitudinal axis of said elongate bars whereby the velocity of water flowing against the planar surface of said float means raises the second lower end of the collector means for pivotal movement around said horizontal member.

2. Apparatus according to claim 1 wherein a conduit is arranged in conjunction with said stream and in general alignment therewith and wherein said collector means is pivotally mounted adjacent the upper portion of said conduit.

3. Apparatus according to claim 1 wherein the second end portions of said collector bars are arcuate and extend downwardly.

4. Apparatus according to claim 1 wherein a rack is fixed in position adjacent the first said upper end of collector means and arranged to receive debris therefrom.

* * * * *